No. 894,207.  
PATENTED JULY 28, 1908.  
H. P. JACOBSON.  
PATTERN DRAFT OR CHART.  
APPLICATION FILED FEB. 24, 1906.
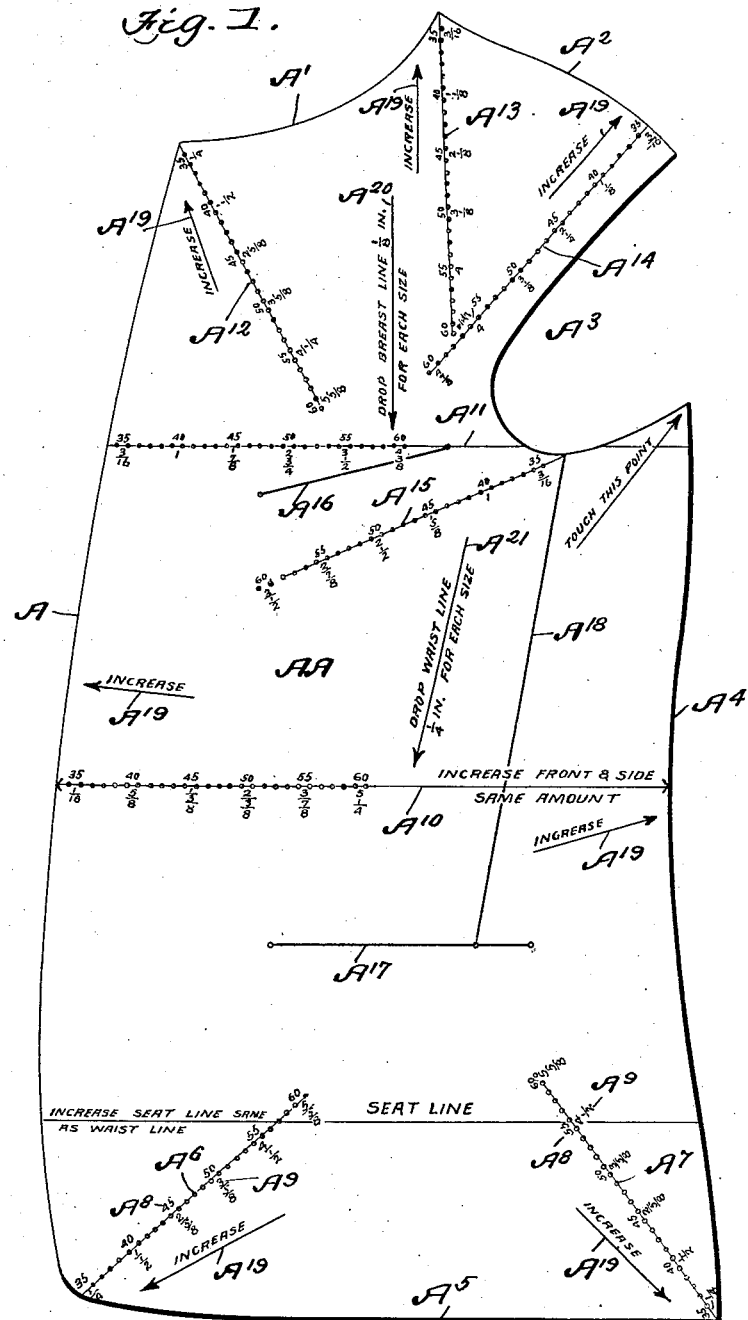
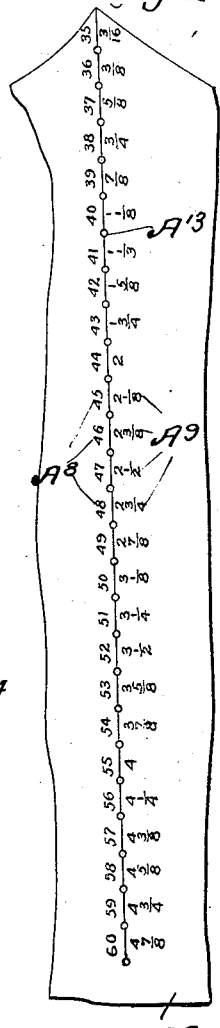
INVENTOR  
H. P. Jacobson,

UNITED STATES PATENT OFFICE.

HAMLET PETER JACOBSON, OF BROOKLYN, NEW YORK.

PATTERN DRAFT OR CHART.

No. 894,207.  Specification of Letters Patent.  Patented July 28, 1908.

Application filed February 24, 1906. Serial No. 302,783.

*To all whom it may concern:*

Be it known that I, HAMLET PETER JACOBSON, a citizen of the United States, residing at Brooklyn, in the county of Kings and State of New York, have invented a new and useful Improvement in Pattern Drafts or Charts, of which the following is a specification.

This invention relates to an improvement in dress-makers' and tailors' charts and has for its object the provision of an exceedingly simple construction that may be readily understood and operated by the most inexperienced person, and by which a pattern of larger or smaller dimensions may be quickly marked off with the one chart.

With this main object in view, the invention comprises a chart upon which is arranged perforated lines having different sizes marked thereon, and also an inch scale to show by inches the amount the various sizes should be increased, said lines being arranged upon the chart at the points corresponding to the places where a person is measured when being measured for a suit. The chart also contains various lines to indicate pockets, darts, etc., and also arrow lines bearing certain inscriptions to instruct the person in laying off a pattern and thus obviating the necessity of providing a set of rules or instructions such as those accompanying patterns and charts now generally used, and which is a very serious objection, especially when the charts are being used by inexperienced persons.

The invention further possesses certain peculiar details of construction and arrangement as will be fully set forth in the following specification and pointed out in the claim, reference being had to the drawings in which:—

Figure 1 is a view of the front chart, and Figs. 1$^a$, and 1$^b$, are enlarged detail views illustrating the size numerals, and fractional inch scales provided on all of the lines.

In the drawings I have illustrated a chart of a 34 size and from which patterns of larger or smaller sizes are made.

By reference to Fig. 1, AA, designates the front chart provided with a curved front edge A, a curved neck portion A', a shoulder portion $A^2$, the arm-hole $A^3$, the side edge $A^4$, and the straight bottom $A^5$. From the corners of the front, side and bottom edges are perforated lines $A^6$, and $A^7$, which extend obliquely from the corners and each line is provided with a scale $A^8$, to designate the sizes from 35 to 60, and below each set of size numerals is a scale $A^9$, in fractions of inches ranging from ¼ to 5⅝ and which designate the amount in inches to which a larger or small pattern should be increased or diminished when being marked off by the chart. $A^{10}$, designates the waist-line having a series of perforations extending from the front edge which are also numbered consecutively from 35 to 60 and provided with a fractional inch scale similar to the lines $A^6$, and $A^7$.

$A^{11}$, designates the breast line which is perforated and provided with a scale; $A^{12}$, a similar line extending diagonally from the corner of the front and neck portions; $A^{13}$, a similar line extending from the corner of the neck and shoulder portions; $A^{14}$, a similar line extending from the shoulder adjacent the arm-hole and which runs substantially parallel thereto, and, $A^{15}$, a similar line extending from the lower edge of the arm-hole. All of these lines are provided with numerals denoting the sizes and inch measurements similar to the lines $A^6$, and $A^7$.

$A^{16}$, and $A^{17}$, are lines indicating the position of the pockets and $A^{18}$, a dart line.

$A^{19}$, denotes arrow-lines which are arranged around the edge of the chart to indicate additional points at which the measurements should be made when a pattern of different size is being laid off, and these lines are marked with the word "Increase" to guide and instruct the operator.

$A^{20}$, is an arrow-line bearing the instruction "Drop breast-line ⅛ inch for each size", and $A^{21}$, is a similar line bearing the inscription, "Drop waist-line ¼ inch for each size", and upon the waist-line is printed "Increase front and side the same amount." Upon the seat line is printed the instruction "Increase seat line same as waist-line", and upon the arrow-line extending to the point of the arm-hole and side edge is printed "Touch this point."

In view of the fact that the drawing is made on such a reduced scale, I have not attempted to show all of the dimensions on all of the perforated lines, and therefore, refer to Figs. 1$^a$, and 1$^b$, which are details of several scales enlarged and which show the arrangement of the scales that is followed throughout all the lines.

In laying off a pattern the chart AA is laid upon the paper from which the pattern is to be cut and retained by suitable weights. Now supposing a pattern, size 40, is to be made, the operator marks off from the edge of the chart adjacent the perforated lines and the arrow-lines the amount in inches corresponding to the scale arranged below the numerals indicating the size. For instance in extending the measurement for a pattern, size 40, a point or mark is made ⅝ of an inch from the waist-line at either side of the pattern which is the amount opposite the size number 40. At the lower front and side edges, the lines would be extended 1½ inches, this being the amount indicated by the scale adjacent the size 40. At the breast-line, the front edge would be extended 1 inch, and these dimensions are also marked off at the various other points indicated by the arrow. Care is taken to drop each measurement at the waist- and breast lines according to instructions printed on the charts. For instance in making a pattern for a size 40, the waist-line would be dropped 1¼ inches, and the breast-line ⅝ inches. After the points have been laid off, the chart is then moved over until the edge of the chart registers with the points, and a line drawn along the edge which will bisect each point and of course it is understood that in making a pattern for larger sizes, the lines are extended by the operator to meet the points and as the distance is very short, this may be done with absolute accuracy. In making a pattern from this chart for a smaller size than the chart calls for, a pin or needle is projected through corresponding points throughout the chart after which the chart is moved over so that its edge will bisect each perforation when a line may be drawn to mark off the pattern. For example should it be desired to make a pattern size 32, the operator projects the pin or needle through the second perforation from the edge of the chart, and then by moving the chart so that the edges will bisect the perforation or points, a line is drawn and a pattern quickly laid out. It will thus be seen, that this operation is exceedingly simple and requires but a very short time to make and lay out a pattern, and further comment upon the operation and advantages of the chart is thought unnecessary, as it will be well understood by those skilled in the art to which my invention appertains.

Having thus fully described my invention, what I claim as new and desire to secure by Letters Patent is:—

A front chart for laying off patterns provided with breast-, waist-, and seat- lines, pocket-lines and a dart line, the said breast- and waist- line being perforated for a portion of their length and provided with size numerals and fractional inch scales, perforated scale lines extending obliquely from the lower corners of the chart and having size numerals, and a fractional inch scale, a similar line extending from the corner produced by the front and neck edges, a similar line extending from the corner produced by the neck and shoulder edges, and a similar line extending from the shoulder in substantially parallel direction to the arm-hole of the chart, arrow-lines bearing instructions arranged at certain intervals around the edges of the chart, arrow-lines pointing to the breast- and waist- lines respectively and bearing instructions to assist in making a pattern, and inscriptions printed adjacent the said waist- and seat- lines to instruct the user, all substantially as and for the purpose specified.

HAMLET PETER JACOBSON.

Witnesses:
JULIUS B. DAVENPORT,
ALBERT A. WATTS.